United States Patent
Jiang et al.

(10) Patent No.: US 10,449,958 B2
(45) Date of Patent: Oct. 22, 2019

(54) FEEDBACK-BASED CONTROL MODEL GENERATION FOR AN AUTONOMOUS VEHICLE

(71) Applicant: Ford Global Technologies, LLC, Dearborn, MI (US)

(72) Inventors: Zhen Jiang, Mountain View, CA (US); Yan Fu, Bloomfield Hills, MI (US); Yuzhou Li, Palo Alto, CA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 317 days.

(21) Appl. No.: 15/433,781

(22) Filed: Feb. 15, 2017

(65) Prior Publication Data

US 2018/0229723 A1    Aug. 16, 2018

(51) Int. Cl.
| | |
|---|---|
| *G05D 1/00* | (2006.01) |
| *B60W 30/095* | (2012.01) |
| *B60W 10/18* | (2012.01) |
| *B60W 10/20* | (2006.01) |
| *B60W 30/09* | (2012.01) |
| *G05B 13/04* | (2006.01) |
| *G05D 1/02* | (2006.01) |

(52) U.S. Cl.
CPC ........ *B60W 30/0953* (2013.01); *B60W 10/18* (2013.01); *B60W 10/20* (2013.01); *B60W 30/09* (2013.01); *G05B 13/048* (2013.01); *G05D 1/0088* (2013.01); *G05D 1/0231* (2013.01); *G05D 1/0255* (2013.01); *G05D 1/0257* (2013.01); *G05D 2201/0213* (2013.01)

(58) Field of Classification Search
CPC .. B60W 30/0953; B60W 10/20; B60W 30/09; B60W 10/18; B60W 50/0098; G05B 13/048; G05D 1/0255; G05D 1/0257; G05D 1/0231; G05D 1/0088; G05D 2201/0213

See application file for complete search history.

(56) References Cited

U.S. PATENT DOCUMENTS

| | | |
|---|---|---|
| 5,390,118 A | 2/1995 | Margolis |
| 8,296,013 B2 | 10/2012 | Kuramori |

(Continued)

FOREIGN PATENT DOCUMENTS

| | | |
|---|---|---|
| CN | 104036100 A | 9/2014 |
| CN | 106064623 A | 11/2016 |

(Continued)

*Primary Examiner* — Genna M Mott
(74) *Attorney, Agent, or Firm* — David R. Stevens; Stevens Law Group

(57) ABSTRACT

A computer system receives data sets for a driving maneuver at a location, such as data regarding a state of a vehicle, an external environment indicated by external sensors, and user feedback regarding the driving maneuver. Data sets may be collected from users having various demographic and behavioral attributes. Users may be selected using design of experiment (DOE) algorithms to cover a wide range of possible combinations. A stochastic response surface model (SRSM) is generated that relates sensor data (vehicle state and environmental) to user feedback regarding safety and comfort. The SRSM may be generated using Gaussian process regression (GPR) in order to model uncertainty. The SRSM is then used to generate a control model using an optimization under uncertainty (OUU) algorithm.

18 Claims, 8 Drawing Sheets

(56) References Cited

U.S. PATENT DOCUMENTS

| | | | |
|---|---|---|---|
| 9,469,307 B2 | 10/2016 | Solyom | |
| 9,495,874 B1 | 11/2016 | Zhu | |
| 9,568,915 B1* | 2/2017 | Berntorp | B60W 30/00 |
| 9,958,870 B1* | 5/2018 | Graybill | B60W 40/08 |
| 2013/0096731 A1* | 4/2013 | Tamari | G06F 11/3013 |
| | | | 701/1 |
| 2018/0022361 A1* | 1/2018 | Rao | G05B 13/024 |
| | | | 701/23 |

FOREIGN PATENT DOCUMENTS

| | | |
|---|---|---|
| KR | 101138758 B1 | 4/2012 |
| WO | WO 2018/014697 | 1/2018 |
| WO | WO 2018/057978 | 3/2018 |

\* cited by examiner ized. The controller 102 may receive one or more outputs from one or more exterior sensors 104. For example, one or more cameras 106a may be mounted to the vehicle 100 and output image streams to the controller 102. The exterior sensors 104 may include sensors such as an ultrasonic sensor 106b, a RADAR (Radio Detection and Ranging) sensor 106c, a LIDAR (Light Detection and Ranging) sensor 106d, a SONAR (Sound Navigation and Ranging) sensor 106e, and the like.

FEEDBACK-BASED CONTROL MODEL GENERATION FOR AN AUTONOMOUS VEHICLE

BACKGROUND

Field of the Invention

This invention relates to operating an autonomous vehicle.

Background of the Invention

Autonomous vehicles are becoming much more relevant and utilized on a day-to-day basis. In an autonomous vehicle, a controller relies on sensors to detect surrounding obstacles and road surfaces. The controller implements logic that enables the control of steering, braking, and accelerating to reach a destination and avoid collisions.

The system and method disclosed herein provide an improved approach for implementing control logic for an autonomous vehicle.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
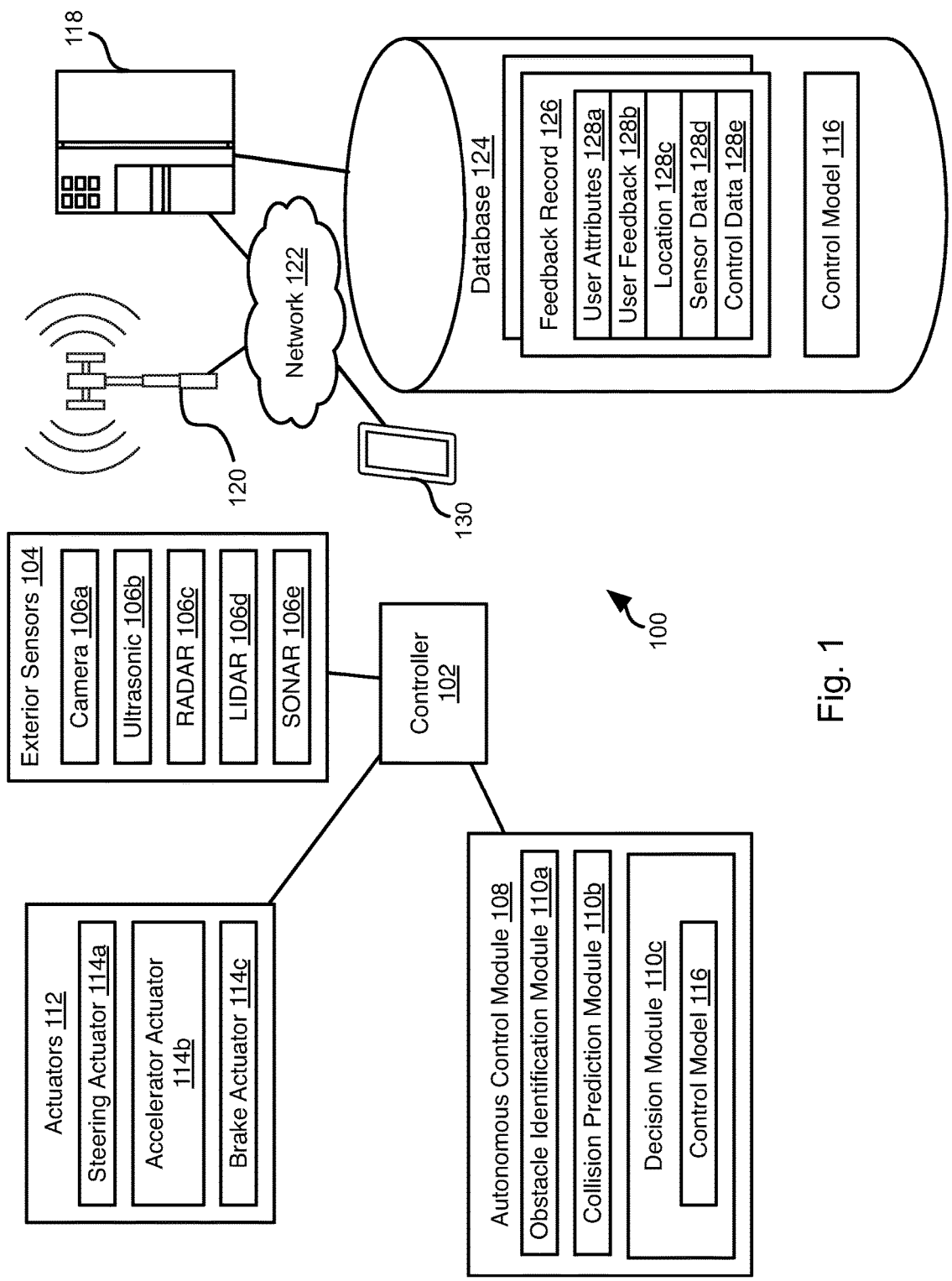
FIG. 1 is a schematic block diagram of components implementing a system in accordance with an embodiment of the present invention.

Referring to FIG. 1, the methods disclosed herein may be performed using the illustrated system 100. As discussed in greater detail herein, a controller 102 may perform autonomous navigation and collision avoidance for a vehicle housing the controller 102. The vehicle 100 may have all of the structures and features of any vehicle known in the art including, wheels, a drive train coupled to the wheels, an engine coupled to the drive train, a steering system, a braking system, and other systems known in the art to be included in a vehicle.

The controller 102 may execute an autonomous control module 108 that receives the outputs of the exterior sensors 104. The autonomous control module 108 may include an obstacle identification module 110a, a collision prediction module 110b, and a decision module 110c. The obstacle identification module 110a analyzes the outputs of the exterior sensors and identifies potential obstacles, including people, animals, vehicles, buildings, curbs, and other objects and structures. In particular, the obstacle identification module 110a may identify vehicle images in the sensor outputs.

The collision prediction module 110b predicts which obstacle images are likely to collide with the vehicle 100 based on its current trajectory or current intended path. The collision prediction module 110b may evaluate the likelihood of collision with objects identified by the obstacle identification module 110a. The decision module 110c may make a decision to stop, accelerate, turn, etc. in order to avoid obstacles. The manner in which the collision prediction module 110b predicts potential collisions and the manner in which the decision module 110c takes action to avoid potential collisions may be according to any method or system known in the art of autonomous vehicles.

The decision module 110c may control the trajectory of the vehicle to navigate to a desired objective while avoiding obstacles. For example, the decision module 110c may activate one or more actuators 112 controlling the direction and speed of the vehicle 100. For example, the actuators 112 may include a steering actuator 114a, an accelerator actuator 114b, and a brake actuator 114c. The configuration of the actuators 114a-114c may be according to any implementation of such actuators known in the art of autonomous vehicles.

In some embodiments, the control decisions made by the decision module 110c may be implemented by control model 116 that is updated and/or generated according to the methods described herein. In some embodiments, the above-described functionality of the obstacle identification module 110a and collision prediction module 110b may also be implemented by the control model 116.

The controller 102 may be in data communication with a server system 118. For example, the controller 102 may be in data communication with one or more cellular communication towers 120 that are in data communication with the server system 118 by way of a network 122, such as a local area network (LAN), wide area network (WAN), the Internet, or any other wireless or wired network connection.

The server system 118 may host or access a database 124. The database 124 may store feedback records 126. The feedback records 126 may correspond to a driving maneuver, e.g. turn, traversal of stretch of road, autonomously parking, or the like. Each feedback record 126 may either include or be associated with a particular user. Accordingly, each feedback record 126 may include or have associated therewith one or more attributes 128a of that user, which may include a user identifier, demographic attributes (age, gender, profession, etc.) as well as driving specific attributes (conservative, adventurous, etc.). These attributes may be self-reported by the user and communicated to the server system 118 or gathered from available data.

The feedback record 126 may include user feedback 128b. The user feedback 128b may be in the form of a rating (e.g. from 1 to 5, with 5 being the best). The user feedback 128b indicates the user's perception of the driving maneuver. For example, if the user felt uncomfortable, a lower rating will be given. The user feedback 128b may include feedback with regard to multiple factors such as feedback with respect to user comfort and feedback with respect to user perception of safety.

The feedback record 126 may record or be associated with a particular location 128c, i.e. the location at which the driving maneuver that is the subject of the feedback record occurred. The location may be a range of locations, e.g. defining a stretch of road traversed; the inlet, apex, and or outlet of a turn; or other range of locations. In this manner, feedback from a single user or a group of users concerning a particular feature of the road may be grouped together.

The feedback record 126 may include or be associated with sensor data 128d corresponding to the driving maneuver that is the subject of the feedback record 126. Sensor data 128d may include outputs from sensors during a period including the driving maneuver, e.g. during the driving maneuver alone or in some window on either side of the driving maneuver, such as 1 to 10 seconds, or corresponding to 5 to 20 feet on either side of the location or range of locations 128c.

The sensor data 128d may include outputs of the exterior sensors 104 during the period that indicates the environment of the vehicle during the maneuver. The sensor data 128d may include outputs of other vehicle sensors during the period, such as sensors indicating the state of the vehicle, such as accelerometers indicating acceleration, yaw rate, rolling, or the like. Accordingly, the sensor data may include outputs of a steering wheel angle sensor, wheel speed sensor, vehicle velocity sensor, engine speed sensor, engine torque sensor, any other engine sensor, or any other sensor for sensing the state of a vehicle as known in the art.

The feedback record 126 may further include control data 128e for the period. Control data 128e may include data describing control decisions taken by the decision model 110c, e.g. braking control outputs (which may indicate both timing and magnitude of the braking), steering road wheel angle changes (which may be represented by a steering column angle change or rack position change), accelerator control outputs (e.g., decreasing or increasing of throttle opening), traction and stability control outputs (braking modulation, torque redistribution among wheels, etc.), or any other control input that affects the trajectory and operation of the vehicle, particularly those that may impact user perception of a driving maneuver.

The database 124 may further store a control model 116. The control model 116 may be a control model 116 corresponding to that of the decision module 110c. The control model 116 may be generated and modified according to the methods disclosed herein based on the feedback records 126. The control model 116 as generated or updated according to the methods described herein may be propagated to various autonomous vehicles, which may then perform autonomous driving according to the control model 116. In some embodiments, the control model 116 may correspond to a particular make and model of vehicle (e.g. Ford Escape) or a particular class of vehicle (e.g., crossover SUV).

As described herein below, a user may provide feedback by means of a mobile device 130, such as a mobile phone, tablet computer or wearable computer. The functions ascribed herein to the mobile device 130 may also be performed by a desktop or laptop computer or any other type of computing device. In some embodiments, the mobile device 130 may communicate directly with the server 118 or by way of the controller 102 or some other intermediary computing device. Alternatively, feedback may be input through the controller 102. For example, a touch screen may be coupled to the controller 102 through which the user provides feedback, such as in-vehicle infotainment (IVI) system. Alternatively, any other input device may be used, such as buttons, a microphone detecting verbal feedback, a keyboard, an optical detector, or the like.

Figure 2:
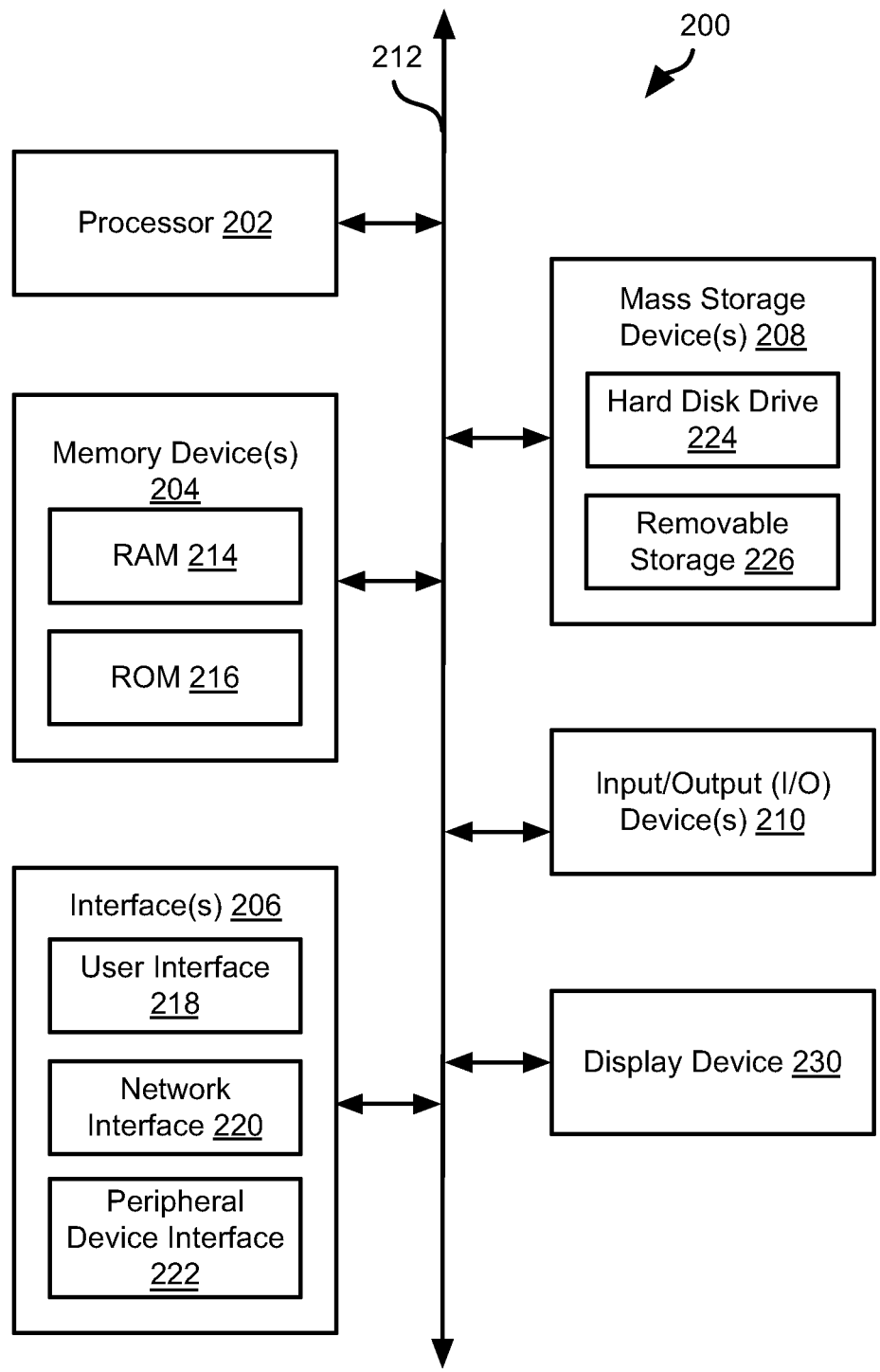
FIG. 2 is a schematic block diagram of an example computing device suitable for implementing methods in accordance with embodiments of the invention.

FIG. 2 is a block diagram illustrating an example computing device 200. Computing device 200 may be used to perform various procedures, such as those discussed herein. The controller 102, server system 118, and mobile device 130 may have some or all of the attributes of the computing device 200.

Computing device 200 includes one or more processor(s) 202, one or more memory device(s) 204, one or more interface(s) 206, one or more mass storage device(s) 208, one or more input/output (I/O) device(s) 210, and a display device 230 all of which are coupled to a bus 212. Processor(s) 202 include one or more processors or controllers that execute instructions stored in memory device(s) 204 and/or mass storage device(s) 208. Processor(s) 202 may also include various types of computer-readable media, such as cache memory.

Memory device(s) 204 include various computer-readable media, such as volatile memory (e.g., random access memory (RAM) 214) and/or nonvolatile memory (e.g., read-only memory (ROM) 216). Memory device(s) 204 may also include rewritable ROM, such as Flash memory.

Mass storage device(s) 208 include various computer readable media, such as magnetic tapes, magnetic disks, optical disks, solid-state memory (e.g., Flash memory), and so forth. As shown in FIG. 2, a particular mass storage device is a hard disk drive 224. Various drives may also be included in mass storage device(s) 208 to enable reading from and/or writing to the various computer readable media. Mass storage device(s) 208 include removable media 226 and/or non-removable media.

I/O device(s) 210 include various devices that allow data and/or other information to be input to or retrieved from computing device 200. Example I/O device(s) 210 include cursor control devices, keyboards, keypads, microphones, monitors or other display devices, speakers, printers, network interface cards, modems, lenses, CCDs or other image capture devices, and the like.

Display device 230 includes any type of device capable of displaying information to one or more users of computing device 200. Examples of display device 230 include a monitor, display terminal, video projection device, and the like.

Interface(s) 206 include various interfaces that allow computing device 200 to interact with other systems, devices, or computing environments. Example interface(s) 206 include any number of different network interfaces 220, such as interfaces to local area networks (LANs), wide area networks (WANs), wireless networks, and the Internet. Other interface(s) include user interface 218 and peripheral device interface 222. The interface(s) 206 may also include one or more peripheral interfaces such as interfaces for printers, pointing devices (mice, track pad, etc.), keyboards, and the like.

Bus 212 allows processor(s) 202, memory device(s) 204, interface(s) 206, mass storage device(s) 208, I/O device(s)

210, and display device 230 to communicate with one another, as well as other devices or components coupled to bus 212. Bus 212 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 200, and are executed by processor(s) 202. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 3:
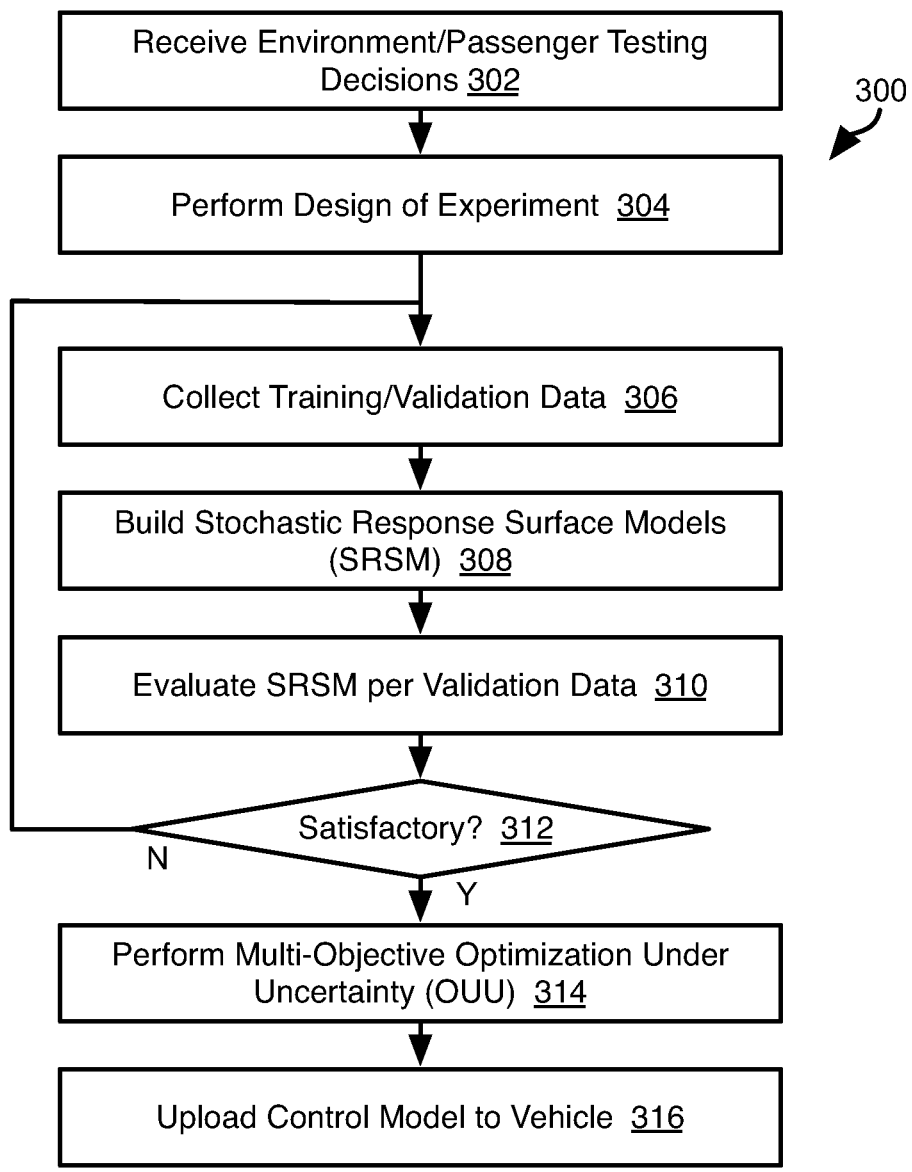
FIGS. 3 is a process flow diagram of a method for generating a control model based on passenger feedback in accordance with embodiments of the present invention.

Referring to FIG. 3, the illustrated method 300 may be executed by the server system 118 in cooperating with a mobile device 130 of one or more passengers and the controllers 102 of one or more autonomous vehicles in which the one or more passengers have traveled or are travelling.

The method 300 may include receiving 302 one or more decisions regarding environments and passengers that are to be the subject of testing. Step 302 may include receiving these decisions from a human operator. For example, an operator may wish to improve the executions of turns by autonomous vehicles. Accordingly, the environments tested may include exclusively turns or a large number of turns. With respect to passengers, a range of values for one or more demographic attributes (age, gender, profession, income, etc.) may be specified. Likewise, range of behavioral attributes relating to driving may be specified, i.e. conservative, risk averse, adventurous, etc.

The method 300 may then include selecting a set of passengers and or locations for evaluation by performing 304 a design-of-experiment (DOE) algorithm. It is impossible to cover every combination of location, demographic, and behavioral attributes. Accordingly, performing 304 DOE is intended to ensure a diverse collection of test data. The method in which step 304 is performed is described in greater detail below with respect to FIG. 5.

The method 300 may further include collecting 306 data for training and validation of the control model 116. As noted above, this may include collecting some or all of the data described above with respect to the feedback records 126. As noted above, this may include collecting sensor data as well as user feedback.

Figure 4:
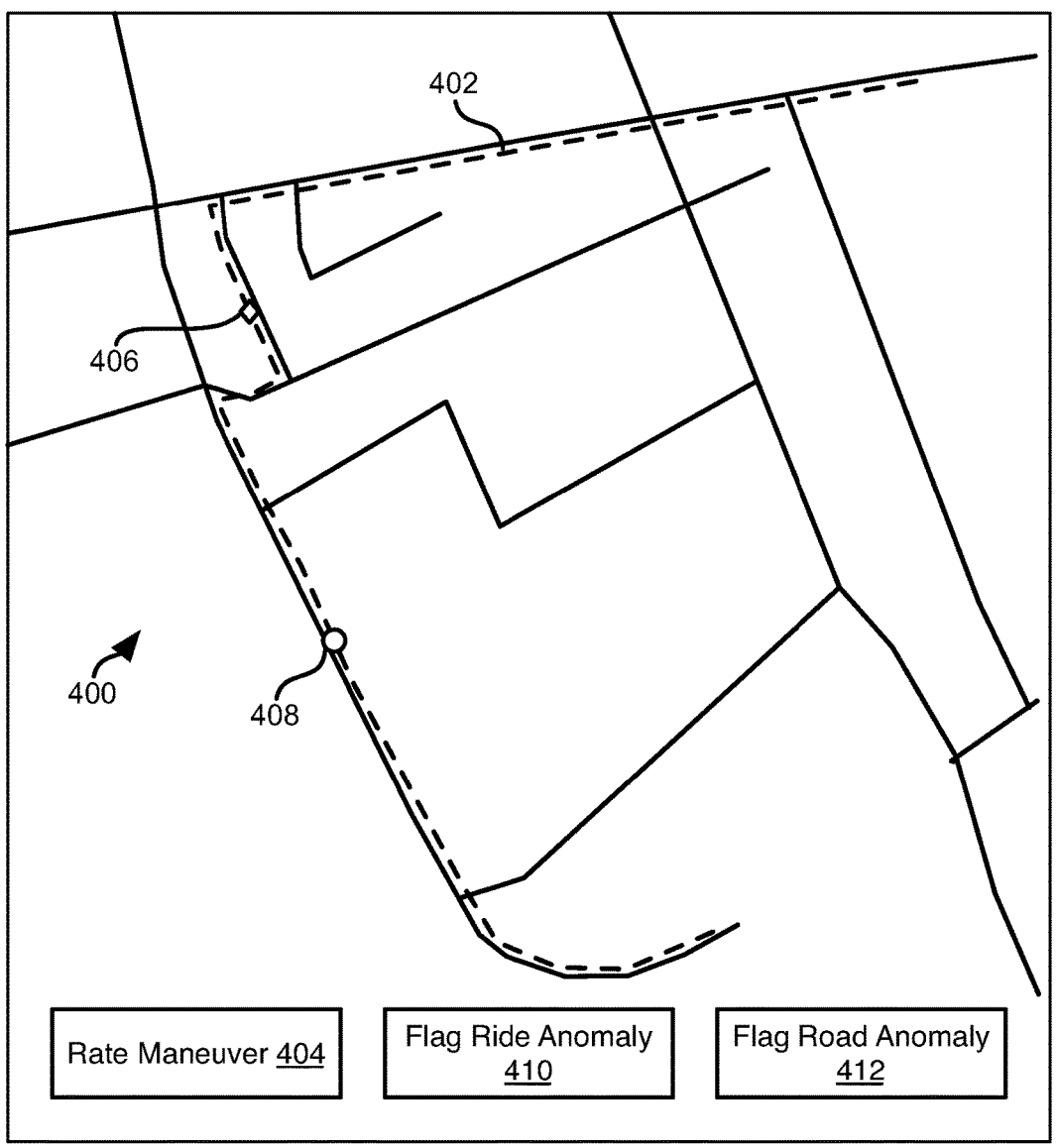
FIG. 4 illustrates an interface for receiving passenger feedback in accordance with an embodiment of the present invention.

FIG. 4 illustrates an example interface through which a user may provide feedback regarding a driving maneuver. The interface may include a map 400 illustrating streets, landmarks, labels of streets and landmarks, and any other information that may be included in a map as known in the art. The map may be superimposed over a satellite image of the area represented by the map as known in the art.

The interface may include an interface element 404 that a user may select in order to provide a rating of a driving maneuver or an entire ride, e.g. a positive or negative rating, a selection of a value form 1 to N, where N indicates no problems and 1 indicates a poor quality ride. In some embodiments, multiple interface elements 404 may be provided for receiving feedback regarding multiple aspects of the driving maneuver, e.g., comfort, safety, perceived smoothness etc.

The interface may include a rendering 402 of a path of the vehicle during the ride superimposed on the map. The interface may receive user inputs specifying locations 406, 408 at which anomalies occurred during the ride. In some embodiments, the interface may receive passenger specification of types of anomalies. For example, interface element 410 may enable the passenger to flag a location of a ride anomaly. For example, following selection of interface element 410, a subsequent selection on the path 102 may be interpreted as user specification of a ride anomaly. The interface may further receive a user specification of a type of the ride anomaly, i.e. an autonomous action of the vehicle that the passenger feels was not well executed, such as departure from a lane, a turn that was taken too fast or that deviated from an appropriate path, or the like.

The interface may include an interface element 412 that enables the passenger to specify that a selected point on the path map 400 corresponds to a road anomaly, e.g. a pot hole, shut down lane, road construction, blocked road, accident etc.

In some embodiments, the interface may solicit feedback concerning specific locations such as locations selected at step 304 for investigation. Accordingly, the map 400 may include highlighted portions indicating where feedback is needed. Alternatively, images of curves or other road segments maybe displayed along with an interface for receiving feedback regarding traversal of the illustrated segment.

The interface of FIG. 4 may be shown to the passenger after the ride or throughout the ride. For example, immediately following traversal of a road segment that is a location of interest, the interface of FIG. 4 may be provided in order to solicit feedback from the user regarding performance of the autonomous vehicle over that road segment.

As noted above, the interface may be displayed on the user's mobile device 130 or on a screen that is integral to the autonomous vehicle, such as a touch screen of an in-vehicle infotainment system.

Turning again to FIG. 3, the method 300 may include building 308 one or more stochastic respond surface model (SRSM). The SRSM a relates desired output, positive user feedback to inputs such as sensor data (vehicle state and environmental factors) and control actions taken by the autonomous vehicle. The method in which the SRSMs are generated is described below with respect to FIGS. 6A and 6B and FIGS. 7A and 7B.

The method 300 may include evaluating 310 the SRSMs according to validation data. In particular, the SRSMs may be generated at step 308 using a portion of the data collected at step 306. A portion of the data from step 306, e.g. 10 percent or some other portion of the feedback records 126, may be held back and used at step 310 to evaluate the SRSMs. In particular, the ability of the SRSM to predict user feedback for a given set of inputs will be evaluated 310.

If the validation data is found 312 to indicate that the SRSMs are not sufficiently accurate in predicting user feedback, the steps of 306-312 may be repeated, i.e. more data may be collected 306 in order to obtain more accurate SRSMs. What is sufficiently accurate may be set according to human judgment. For example, greater than 90% accuracy may be sufficient. For example, if the SRSMs predicts correctly that feedback is above or below some favorability threshold, e.g. 6 out of 10, for at least 90% the input data sets in the validation data (or some other threshold percentage), the SRSMs may be deemed sufficiently accurate.

If the validation data is found to indicate that the SRSMs are sufficiently accurate, the method 300 may include generating the control model 116 by performing 314 Multi-Objective Optimization Under Uncertainty. As described below with respect to FIG. 8, step 314 may include generating a control model 116 to optimize achievement of a desired property (e.g., positive user feedback) in view of the uncertainty in the SRSMs that are used to model the response of a user to a given state (e.g. sensor data indicating the vehicle state and environmental factors). The manner in which step 314 is performed is describe below with respect to FIG. 8.

The control model that is the result of step 314 may then be uploaded 316 to one or more autonomous vehicles that will then use the control model to autonomously control the autonomous vehicles. The autonomous vehicles that receive the updated control model may include the same autonomous vehicles from which data is collected at step 306 and may additionally or alternatively include other autonomous vehicles.

Figure 5:
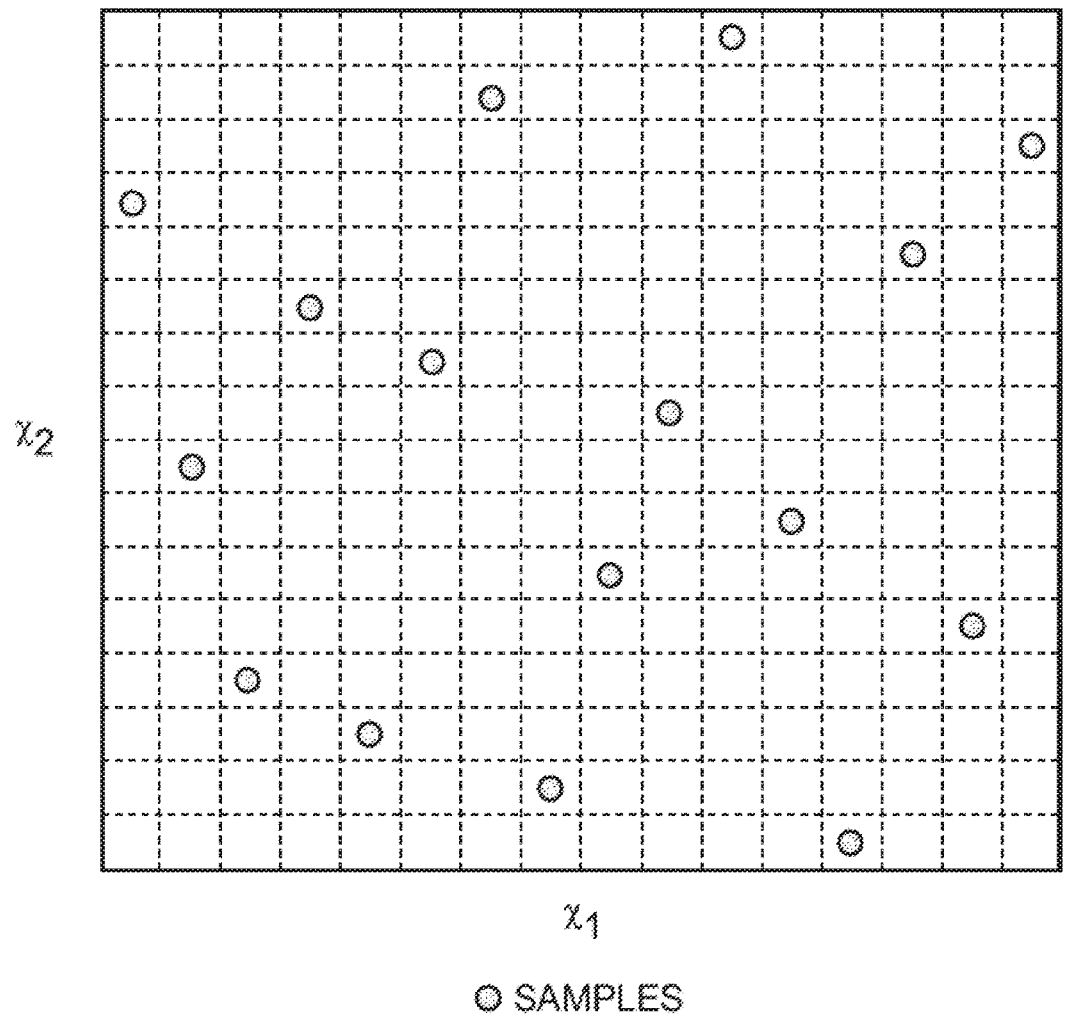
FIG. 5 is a plot illustrating a design of experiment process in accordance with an embodiment of the present invention.

Referring to FIG. 5 uniform DOE (design of experiments) is a class of techniques that seek to generate uniform samples over the region of interest (defined by the upper and lower bounds of input factors) for physical experiments. It aims at gathering as much information as possible over the whole region of interest while using a limited amount of data, and should have the following properties:

The sample points should cover a wide range of the space formed by the input factors.

The sample points should spread out over the input space evenly without apparent clustering.

If projected onto any subspace spanned by a subset of input factors of the system, the sample points should still maintain an even distribution without clustering.

In this case, performing 304 DOE seeks to obtain test data for a wide range of environmental conditions, a wide range of user types (e.g., demographic and behavioral attributes), and a wide range of control actions (e.g., both conservative and aggressive).

Performing 304 DOE may include using a combination of Latin Hypercube sampling (LHS) and Adaptive Sampling (AS) to design the input settings of the experiments, e.g., weather, road conditions, passengers' attributes, etc. FIG. 5 provides an illustrative example of LHS design with 16 sample points over a two-dimensional input space $\{x_1, x_2\}$. The sample points are scattered on the space without clustering, and they form an evenly spaced distribution if projected onto either the $x_1$ axis or the $X_2$ axis. On the other hand, the designs provided by LHS may be too restricted in that they may not be directly available from, for example, the pool of potential passengers to invite. Therefore, AS is performed as well. For example, the distribution determined according to LHS may be adjusted to match the testing capabilities (e.g. the pool of available passengers) while maintaining the preferred properties of LHS as outline above (no clustering, evenly spaced distribution, etc.).

For example, LHS may be used to provide an initial distribution of designs (e.g. combination of parameters) to be tested. Those that are unfeasible, such as due to the limited pool of passengers, may then be filtered out. AS may then be performed based on the set of remaining designs and available testing capabilities to fine new designs, in an iterative process, until a sufficient number of designs is found.

As outlined above, performing 304 DOE may comprise performing DOE across a range of user attributes (demographic and behavioral) and a plurality of environmental factors. Accordingly, the two-dimensional grid is replaced with an N-dimensional grid, N being an integer larger than three, with the same goal of achieving an un-clustered distribution as outlined above. In some embodiments, a particular point in the DOE grid may be tested once or repeatedly. Where multiple tests are performed, insight is obtained into experimental variation.

Figure 6A:
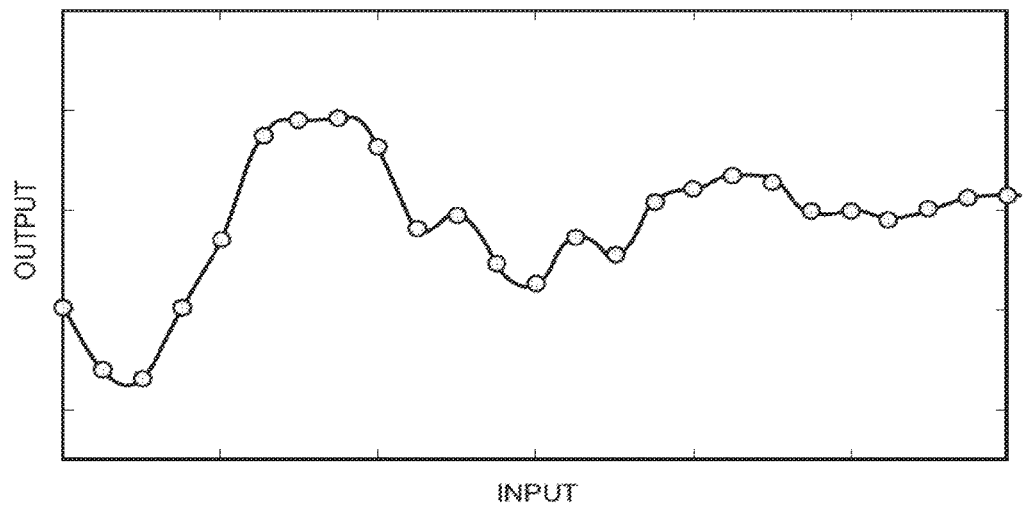
FIGS. 6A and 6B are plots illustrating stochastic response surface modeling (SRSM) in accordance with an embodiment of the present invention.
Figure 6B:
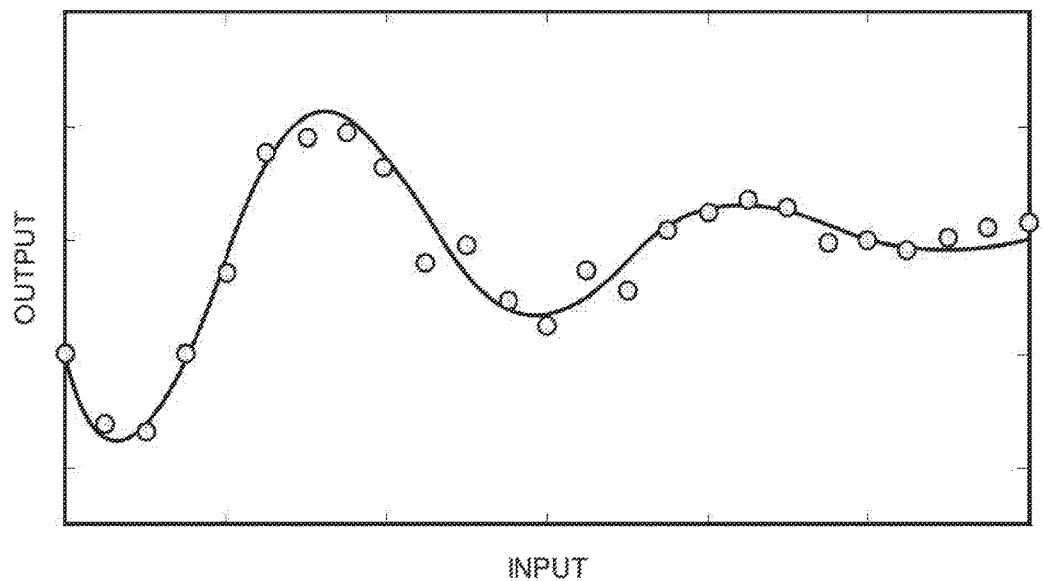
Figure 7A:
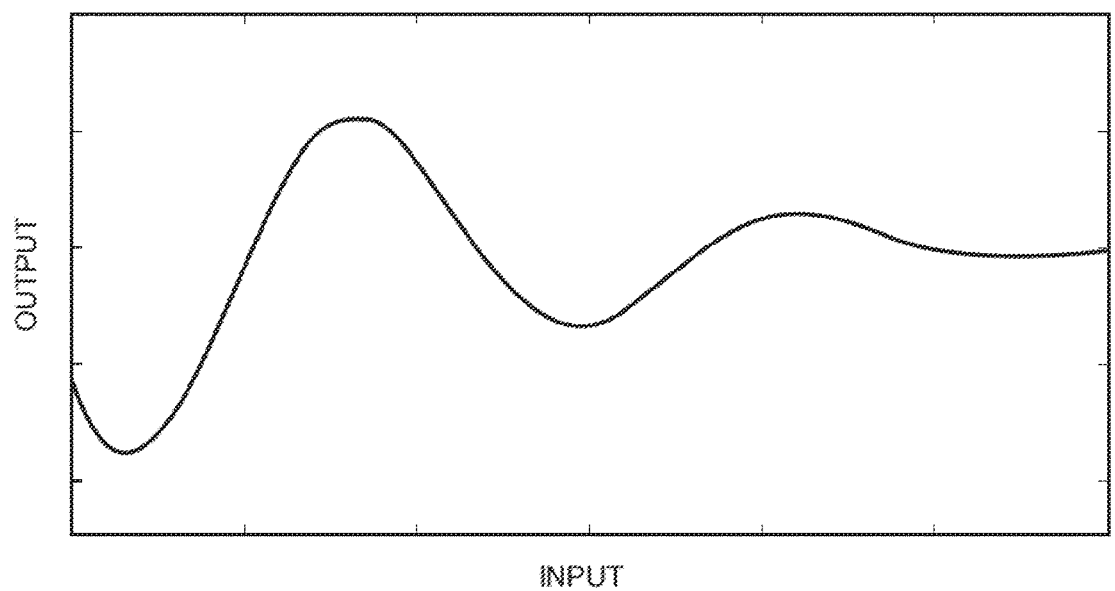
FIGS. 7A and 7B are plots showing modeling of uncertainty of an SRSM approach in accordance with an embodiment of the present invention.
Figure 7B:
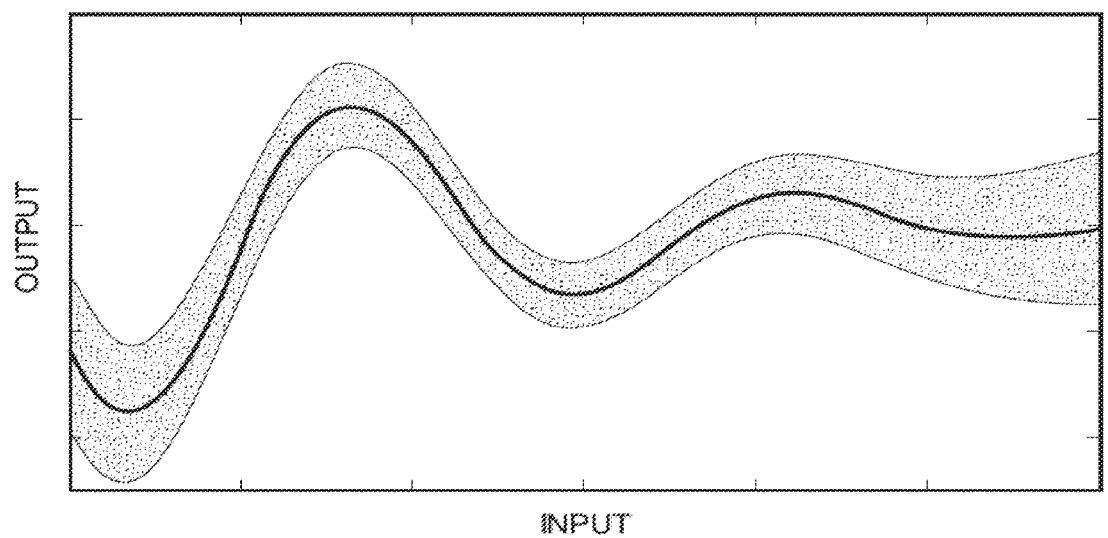

Referring to FIGS. 6A and 6B, building 308 the SRSMs may be implemented using a methodology that builds relationship between input factors x (e.g., the sensor data and control actions taken by the controller 102 during testing) and output response y(x) (e.g., the user feedback and/or control efficiency) based on the collected data $\{x_i, y_i: i=1, \ldots, N\}$ where $y_i=y(x_i)$, at some discretized sample points $x_i$ (i=1, . . . ,N). In this case, each sample point may be one driving maneuver at a given location. Building 308 the SRSMs seeks to relate desired outputs such as passenger safety S, passenger comfort C, and control efficiency E to various inputs, including the sensor data 128d (reflecting the vehicle state and environmental factors detected by external sensors 104) and control actions data 128e. In general, control efficiency E is difficult to quantify but may be approximated by an amount of time required to execute the driving maneuver. Accordingly, the user feedback 128b may be used as proxy for some or all of values S, C, and E.

These collected data are referred to as the training data. RSM (response surface modeling) techniques can generally be categorized as (strict) interpolation (see FIG. 6A) and regression (see FIG. 6B). Both aim at building a functional response $\hat{y}(x)$ as an approximation of y(x); however, the model constructed by strict interpolation methods exactly passes through all the training data, while one constructed by regression methods usually strikes a balance between matching the training data and generating a smooth RSM.

According to their different properties, they are used for different purposes: interpolation methods are applied to generating RSMs of expensive computer simulations (which results in a "metamodel", meaning "model of a computer model"), as computer simulations typically do not involve noise and variations; on the other hand, regression methods are applicable to building RSMs for physical experiments that are inevitably influenced by test conditions, systematic variability, human errors, etc. When faced with noisy experimental data, it is no longer meaningful (and is practically difficult) to pass through every single training data point, otherwise ending up with a highly fluctuating ("zigzagging") function.

Regardless of the category, developing RSM techniques is associated with two major challenges, the first one being the flexibility in the functional form and the capability of adapting to the training data. Most of the existing methods in the more traditional literature assume some parametric functional form for the underlying function y(x). For example, linear regression assumes that the response is a linear combination of the input factors, i.e., $y=a^T x+b$, where a and b are factors determined according to the linear regression process, and polynomial regression assumes a polynomial relationship between y and x, etc. Such assumptions greatly simply the construction of RSMs, but on the other hand lack the ability to adjust to real-world engineering applications, which, in many cases, involve complex responses that cannot be described by a simple functional form.

Another challenge, which is extremely rarely addressed in the existing literature, is the ability to quantify the uncertainty in the prediction. The uncertainty stems from the lack of knowledge/information, for example at the input settings simulated or physical tests have not been conducted; and from the physical variability, for example the experimental variation whose level can hardly be exactly known. In the presence of uncertainty, it is helpful for engineers to understand "how wrong" the constructed RSM $\hat{y}(x)$ can be and how much the actual test data can be off the model prediction. Yet very few methods can tackle this. A RSM with uncertainty quantified essentially indicates a series of functions that can possibly be the underlying physical function, and is referred to herein as a stochastic RSM, in contrast to a deterministic RSM that only provides a single predictor ŷ(x) at a particular input setting x (see FIGS. 7A and 7B).

In some embodiments, the Gaussian process regression (GPR) is used as the SRSM method, because it is not restricted to any specific functional forms and can deal with the noisy experimental data. It also advantageously has a nice feature that it provides a prediction distribution (which can also be interpreted as a prediction variance, a prediction interval, etc.) which quantifies the uncertainty in the prediction. A detailed description of the method is as follows.

Gaussian process (GP) is a specific type of spatial random processes (SRP) that can be viewed as a collection of random variables distributed over (i.e., indexed by) some spatial input space x. The experimental response y(x) can be decomposed as:

$$y(x)=y^t(x)+\varepsilon, \quad (1)$$

where $y^t(x)$ denotes the underlying "true" response (without the influence of experimental variability), and $\varepsilon \sim N(0,\lambda)$ is a zero-mean normal random variable with variance $\lambda$ (typically assumed unknown) that represents the experimental variability. A GP model for $y^t(x)$ is denoted by $$y^t(x) \sim GP(m(x), V(x, x')), \quad (2)$$

where m(x) and V(x,x') are the mean function and the covariance function, respectively, of the GP.

A frequently used form of the mean and covariance functions is $$m(x)=h(x)^T\beta, \quad (3)$$

$$V(x, x')=\sigma^2 \exp\{-\Sigma_{k=1}^p \omega_k(x_k-x'_k)^2\}, \quad (4)$$

where p is the dimension of x, i.e. $x=(x_1, x_2, \ldots, x_p)^T$. h(x) is a vector of user-predefined polynomial functions used to represent the prior mean. $\beta$ is the vector of coefficients associated with h(x) for polynomial regression of the mean, $\sigma$ is the prior standard deviation for a single random variable in the random process, and $\omega=[\omega_1, \omega_2, \ldots, \omega_p]^T$ is the vector of roughness parameters that are used to capture the non-linearity of the process.

Constructing the GP of the experimental response y(x) is equivalent to estimating the unknown parameters of the GP, i.e., $\varphi=\{\beta, \sigma, \omega, \lambda\}$ by the maximum likelihood estimation (MLE) approach, and thus may be solved using a numerical optimization strategy.

In the above generic discussion, x can be interpreted as a combination of the sensor data and the control action in the maneuver, and y is the user feedback. $\varepsilon$ is a random term that accounts for the variation in testing (e.g., the wide variety of users' preferences, the testing conditions that we are not able to capture . . . ). The other variables (for example m, V, h) are all latent variables that are necessary to construct the relationship between y and x.

Figure 8:
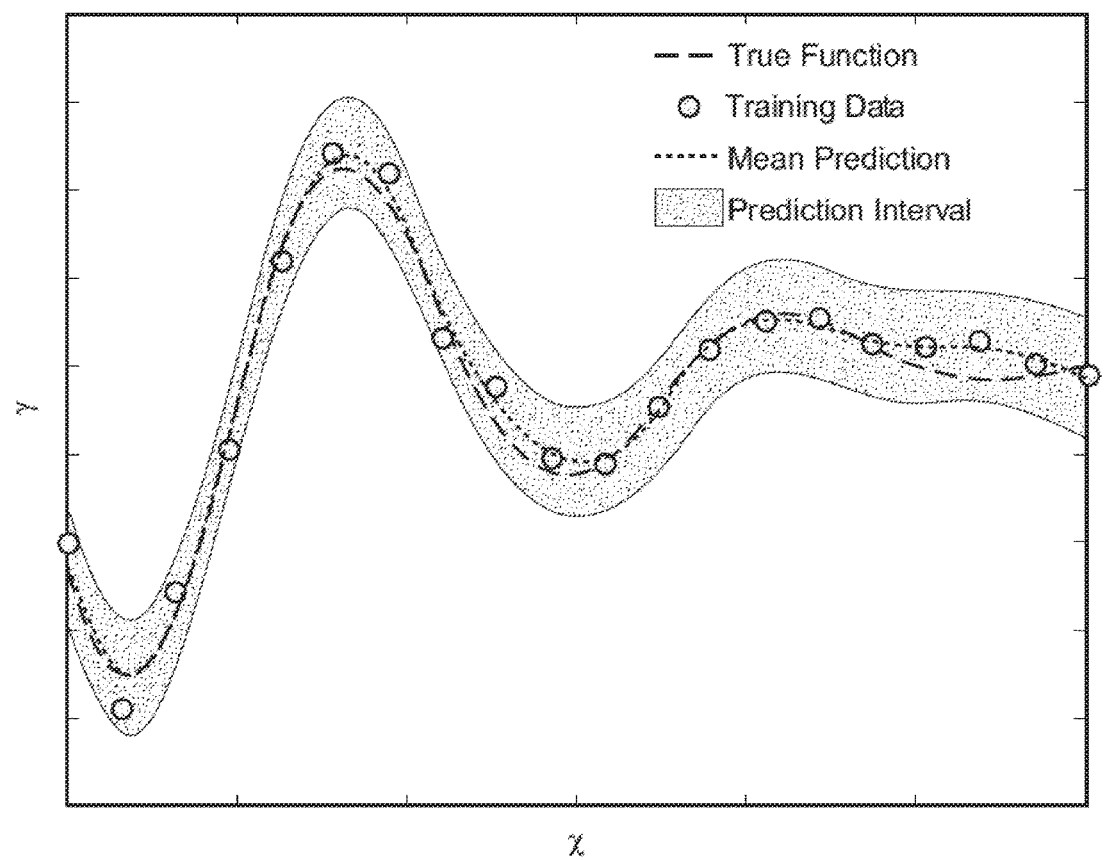
FIG. 8 is a plot illustrating a Gaussian process regression in accordance with an embodiment of the present invention.

Referring to FIG. 8, after the most likely values of $\varphi$ are determined, the GP is fully determined and can subsequently be used to predict the values at other designs. A benefit of using GPR is that it can quantify the interpolation uncertainty at the locations that have not yet been tested and the experimental variability, represented by a prediction interval depicted by the shaded region in FIG. 8.

As the uncertainty associated with the prediction of output responses is quantified, it is helpful to incorporate uncertainty in the optimization formulation of step 314 in FIG. 3. A line of research on advanced approaches for OUU aims at improving robustness of design performance and reducing its sensitivity to the uncertainty, which is known as robust design optimization (RDO). Another category of OUU is reliability-based design optimization (RBDO), aiming at satisfying the constraints at a certain level of confidence. A combination of RDO and RBDO is disclosed herein, with the former to maximize passengers' comfort C and the control efficiency E (equivalently, to minimize –C and –E), and the latter to satisfy the requirements on safety S. The mathematical formulation is:

$$\min -\mu_C(x)+k_C\sigma_C(x),$$

$$\min -\mu_E(x)+k_E\sigma_E(x),$$

$$\text{s.t.} Pr[S(x) \geq S_{target}] \geq \alpha \%$$

$$x^L \leq x \leq x^U \quad , (5)$$

where x, the vector of input variables, is targeted inside the region of interest confined by lower bound $x^L$ and upper bound $x^U$. $\mu$ and $\sigma$ are the mean and standard deviation, respectively, of their subscripts. $S_{target}$ is the safety requirement, $\alpha$ % is the level of confidence that the safety requirement would be met, and $k_C$ and $k_E$ are predefined weighting factors representing the relative importance of reducing variability in optimization.

As used herein optimization refers to a process of improvement that seeks to approach an optimum solution and that improves across multiple iterations, though the actual optimum solution is not required to be obtained in order to obtain the benefit of the approach disclosed above. Likewise, the formulation of (5) refers to seeking of minimums subject to constraints such that for multiple iterations the values in the "min" expressions decrease, though the absolute minimum possible values for the "min" expressions need not actually be reached in order to obtain the benefit of the approach disclosed above.

Equations (1)-(4) detail how to construct the relationship between any output y and input x using GPR, i.e. it is not specific to any particular application. Applying this method to the feedback records 126, one can construct the relationship between user's comfort C (which is equivalent to y in Equations (1)-(4)) and inputs x. Similarly, we can get the relationship between E (which can also be viewed as y in Equations 1-4) and x.

After applying the method, one obtains a relationship similar in form to the graph of FIG. 8. Therefore, $\mu_C(x)$ and $\mu_E(x)$ are the "mean predictions" of C and E in FIG. 8, and $\sigma_C(x)$ and $\sigma_E(x)$ are quantification of uncertainty of C and E ("prediction interval" in FIG. 8).

To obtain a relationship between safety S and the input variable x, one may conduct computer simulations of the testing cycle (i.e. using the sensor data and control actions indicated in the feedback records 126) and determine whether any unsafe conditions occurred.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The invention claimed is:

1. A method comprising, by a computer system:
   receiving feedback from one or more passengers of one or more autonomous vehicles;

receiving sensor data and control data from the one or more autonomous vehicles;

generating a behavioral model according to the feedback, sensor data, and control data;

determining uncertainty for the behavioral model; and generating a control model according to the behavioral model and the uncertainty for the behavioral model;

wherein generating the behavior model according to the feedback and sensor data comprises generating a stochastic response surface model (SRSM) according to the feedback and sensor data, the SRSM relating the feedback to environmental factors indicated by the sensor data, status of the one or more autonomous vehicles indicated in the sensor data, and control actions taken by the autonomous vehicle indicated in the control data.

2. The method of claim 1, wherein the feedback includes one or more driving maneuver ratings, each rating including a location.

3. The method of claim 2, wherein receiving feedback includes receiving feedback from a plurality of passengers.

4. The method of claim 3, further comprising selecting, by the computer system, the plurality of passengers according to design of experiment criteria.

5. The method of claim 3, further comprising selecting, by the computer system, the plurality of passengers according to a design of experiment algorithm that processes potential passengers for selection according to demographic attributes of the potential passengers and driving preferences of the potential passengers.

6. The method of claim 1, further comprising:
evaluating, by the computer system, the SRSM according to a portion of the feedback, sensor data, and control data;

determining, by the computer system, that the SRSM does not satisfactorily correspond to the portion of the feedback, sensor data, and control data;

in response to determining that the SRSM does not satisfactorily correspond to the portion of the feedback, sensor data, and control data, collecting additional feedback, additional sensor data, and additional control data; and generating an updated SRSM using the additional feedback, additional sensor data, and additional control data.

7. The method of claim 1, wherein generating the control model according to the behavior model and the uncertainty for the model comprises performing a multi-objective optimization under uncertainty (OUU) algorithm using the behavioral model and the uncertainty for the behavioral model.

8. The method of claim 1, wherein the sensor data includes outputs of at least one of a light detection and ranging (LIDAR) sensor, a radio detection and ranging (RADAR) sensor, and one or more cameras.

9. The method of claim 1, further comprising:
uploading the control model into an autonomous vehicle;
receiving, by a controller of the autonomous vehicle, outputs of one or more sensors; and
autonomously driving, by the controller, the autonomous vehicle using the outputs processed according to the control model.

10. A system comprising one or more processing devices and one or more memory devices operably coupled to the one or more processing devices, the one or more memory devices storing executable code effective to cause the one or more processing devices to:
receive feedback from one or more passengers of one or more autonomous vehicles;
receive sensor data and control data from the one or more autonomous vehicles;
generate a behavioral model according to the feedback, sensor data, and control data;
determine uncertainty for the behavioral model; and
generate a control model according to the behavioral model and the uncertainty for the behavioral model;
wherein the executable code is further effective to cause the one or more processing devices to generate the behavior model according to the feedback and sensor data by generating a stochastic response surface model (SRSM) according to the feedback and sensor data, the SRSM relating the feedback to environmental factors indicated by the sensor data, status of the one or more autonomous vehicles indicated in the sensor data, and control actions taken by the autonomous vehicle indicated in the control data.

11. The system of claim 10, wherein the feedback includes one or more driving maneuver ratings, each rating including a location.

12. The system of claim 11, wherein the one or more passengers include a plurality of passengers.

13. The system of claim 12, wherein the executable code is further effective to cause the one or more processing devices to select the plurality of passengers according to design of experiment criteria.

14. The system of claim 12, wherein the executable code is further effective to cause the one or more processing devices to select the plurality of passengers according to a design of experiment algorithm that processes potential passengers for selection according to demographic attributes of the potential passengers and driving preferences of the potential passengers.

15. The system of claim 10, wherein the executable code is further effective to cause the one or more processing devices to:
evaluate the SRSM according to a portion of the feedback, sensor data, and control data;
if the SRSM does not satisfactorily correspond to the portion of the feedback, sensor data, and control data:
collect additional feedback, additional sensor data, and additional control data; and
generate an updated SRSM using the additional feedback, additional sensor data, and additional control data.

16. The system of claim 10, wherein the executable code is further effective to cause the one or more processing devices to generate the control model according to the behavior model and the uncertainty for the model by performing a multi-objective optimization under uncertainty (OUU) algorithm using the behavioral model and the uncertainty for the behavioral model.

17. The system of claim 10, wherein the sensor data includes outputs of at least one of a light detection and ranging (LIDAR) sensor, a radio detection and ranging (RADAR) sensor, and one or more cameras.

18. The system of claim 10, wherein the executable code is further effective to cause the one or more processing devices to upload the control model into an autonomous vehicle.

* * * * *